United States Patent Office 3,165,566
Patented Jan. 12, 1965

3,165,566
ONE STEP POLYAMINE CURING FOR POLYURETHANE THREADS
Walter T. Murphy, Cuyahoga Falls, and Bernard F. Cinadr, Brecksville, Ohio, assignors to The B. F. Goodrich Company, New York, N.Y., a corporation of New York
No Drawing. Filed June 29, 1961, Ser. No. 120,526
11 Claims. (Cl. 264—184)

This invention relates to a polyurethane filament or thread having superior properties. More particularly it relates to a polyurethane thread prepared from a low molecular weight, polyurethane prepolymer.

An object of this invention is to prepare an elastic polyurethane thread that is capable of undergoing a relatively high elongation without breaking.

Another object is to provide a method of making polyurethane thread from a prepolymer which has been strengthened before spinning by the addition of a polyol compound so that filaments can be formed which are strong enough to successfully pass through a rapid curing bath.

Low molecular weight polyurethane prepolymers are essentially linear, isocyanate-terminated, reactive intermediate polymers which when allowed to react with appropriate components are employed to make solid elastomers, films, sheets and the like. These prepolymers can also be extruded through dies from solvent solutions and formed into thread-like filaments by coagulation in air or a liquid bath, or they may be melt-spun, but filaments so formed are too weak to draw or pull through processing equipment. They are heat softenable and tend to soften and clog the spinning nozzles. If filaments do form, they tend to break in short lengths and disperse in the coagulating bath. One method known to the art for handling such materials is to pass the filaments through a diprimary amine to harden the surface or skin. The fluid core of the filament is then cured by reaction with water in a pressure vessel.

Our invention lies in the fact that we have discovered that low molecular weight linear polyurethane preploymers can be strengthened before spinning them into filament form by combining them with a polyhydroxy compound which serves to extend the polymer chain, increase the melt viscosity and increase the molecular weight. We then spin the materials into a particular reactive or catalytic curing bath to obtain a completely cured fiber which can be washed, dried and taken up on any desired thread processing equipment.

The linear, isocyanate-terminated polyurethane prepolymers employed in the practice of our invention are reaction products of aromatic polyisocyanates, usually diisocyanates, with polyesters, said polyesters being obtained by the reaction of polyols and polybasic acids, for example, glycols and dibasic acids, or by transesterifications. The molecular weights range from as low as 200–300 to as high as 5,000. They are usually solids at room temperature and are easily handled. They are low melting and become liquid generally at temperatures below 60° C.

The reaction mixture forming the polyesters may contain minor amounts of amino alcohols, diamines and the like. Depending upon the types of glycol, dibasic acid and other component employed, and on the time of reaction, the molecular weight of the polyesters can be varied.

Polyesters (polyester glycols) used in making the prepolymers of this invention are prepared, for example, by an esterification reaction of a polybasic acid or an anhydride thereof with a glycol, by transesterification and by other well-known methods. Polyesteramides may also be used and are essentially polyesters. The polyesteramides are prepared by the condensation of polybasic acid with a mixture of glycol, an amino hydroxy compound and/or a diamine. In the case of the amino hydroxy compound or diamine the latter two ingredients are present in the reaction mixture in an amount less than one-half the amount of glycol employed so that the major portion of the linkages in the polymer chain are ester linkages with a minor proportion of amide linkages being present.

In preparing prepolymers it is essential that polyesters which are at least substantially or essentially hydroxyl terminated be used. Such materials are obtained by reacting an excess of a glycol with a dibasic acid or anhydride thereof which is preferably an aliphatic dibasic acid.

For example, the reactants, such as an excess of ethylene glycol and adipic acid, are reacted together by heating, preferably at about 190° C. at atmospheric pressure for several hours, and then while the heating is slowly continued, the pressure is reduced over another several hour period. During the initial heating period substantially all of the water of esterification and excess reactants are removed and this may be facilitated by passing dry nitrogen through the molten mass. Polyesters of average molecular weights of about 400 to 2,000 are obtained in this way. By continuing the evacuation and heating the batch at higher temperatures polyesters of average molecular weights as high as 5,000 and above may be obtained.

The polyester utilized includes polyesters prepared from the esterification of such polybasic acids as the dicarboxylic acids including malonic, succinic, glutaric, adipic, pimeleic, sebacic, isosebacic, suberic, azelaic, maleic and the like. Aromatic polybasic acids may also be used alone or included in the mixture with the aliphatic dibasic acids, for example, phthalic acid or hexahydrophthalic acid. Anhydrides of the acids and mixtures of acids and anhydrides also may be used.

Among the polyhydroxy compounds used in preparing the polyesters are preferably glycols, including ethylene glycol, 1,3-butanediol, 1,4-butanediol, pentamethylene glycol, hexamethylene glycol, 1,2-propanediol, 1,3-propanediol, 1,2-butanediol, 2-methyl butanediol-1,4, heptamethylene glycol, octamethylene glycol and the like; and poly(alkylene oxide) glycols such as diethylene glycol and triethylene glycol; and polyhydroxy materials such as glycerin, pentaerythritol, hexane triol, sucrose and the like. Mixtures of glycols may be employed.

Amino alcohols such as ethanolamine, 3-amino propanol, 4-amino butanol, 6-amino hexanol and the like and/or diamines such as ethylene diamine, propane-1,3-diamine, hexamethylene-1,6-diamine and the like may be employed in preparing the polyesteramides.

Usually preferred for making such materials are the essentially linear, essentially hydroxyl terminated polyesters prepared, for example, from glycols and aliphatic dicarboxylic acids. In general, the glycol employed is an aliphatic glycol containing from 2 to 10 carbon atoms of the formula HO—R—OH wherein R contains from 2 to 10 carbon atoms. The most useful aliphatic dibasic acids are those containing from 4 to 10 carbon atoms of the formula HOOC—R—COOH wherein R is an alkylene radical containing from 2 to 8 carbon atoms. The molecular weights of the polyesters may vary from about 200 to 5,000 and more preferably are from about 250 to about 2,500. Although the above-described polyesters are ordinarily employed for making the prepolymers, the polyesteramides also are often useful and are prepared from bi-functional amine-containing materials as described above. Preferably the amount of bi-functional amine-containing materials employed is an amount less than 25% equivalent based on the amount of glycol reacted and preferably the amount used is less than 15% equivalent so that the polyesteramide has less than 25% amide linkages and more than 75% ester linkages in the polymer chains, and correspondingly a similar ratio of terminal groups so that the polyesteramide has a major amount of terminal hydroxyl groups. The polyesteramide reaction products are considered to be essentially polyesters.

The preferred polyesters are substantially di-dimensional or linear, are prepared from the reaction of dibasic acids and glycols, and contain only ester linkages and essentially only hydroxyl chain endings.

Alternatively, polyethers (polyether glycols) may be used in making the prepolymers by reacting them with the polyisocyanate in place of the polyesters described above. Preferred materials are polyalkylene ether glycols which are polyethers derived from alkylene oxides or from other heterocyclic ethers. Examples of useful monomers to make the ethers are ethylene oxide, isopropylene oxide, trimethylene oxide, alpha-methyl trimethylene oxide, 3,3'-dimethyl trimethylene oxide, tetrahydrofurane and the like. The polyethers may be represented by the formula $HO(RO)_nH$ in which R is an alkylene radical and $n$ is a number greater than 1. It is not necessary that all of the alkylene radicals be the same and polyether glycols containing a mixture of radicals may be employed. Also useful are polyarylene ether glycols in which R above is an arylene radical, polyarylene-alkylene ether glycols such as polyethylene phenylene ether glycol, or mixtures thereof with polyalkylene ether glycols. Polyether glycols can also be obtained from the reaction of glycols, polyols and the like in the presence of catalysts with the removal of water. They may be obtained by the reaction by alkylene oxides and glycols or polyols, such as by the reaction of propylene oxide and hexane triol or sucrose and the like. The polyether glycols are liquids or solids. Polyether glycols which are most useful in preparing prepolymers have molecular weights from about 150 to 5,000. Preferably the molecular weight is from about 250 to about 2,500. The preferred polyether glycols are the poly(ethylene ether) glycols and similar di-dimensional ether glycols containing only ether linkages and hydroxyl chain termination.

Polyetheresters (or polyetherester glycols) may be used in making the prepolymers of the invention and may be made by the reaction of glycols, polyols and the like as shown above with polycarboxylic acids as discussed above and materials such as diethylene glycol (i.e. diethylene oxide glycol, (HO—R—O—R—OH), triethylene glycol $(HO(RO)_3H)$, dibutylene glycol and the like). Mixtures of the monomers can be employed so that alternating units of different numbers of carbon atoms will be present in the polymer or the reaction can be conducted so that, for example, the central portion of the polymer can consist of units of the same number of carbon atoms while the end or terminal unit(s) can be of a different number of carbon atoms. These ether-esters may also suitably be modified by incorporating in the reaction mixture minor amounts of amines or amino alcohols. However, the amounts of reactants and the conditions of reaction should be controlled so that the final polymer contains a major amount of terminal hydroxyl groups. Preferred materials contain only ether and ester linkages, are hydroxyl terminated and di-dimensional. Average molecular weights can be from about 200 to 5,000 or more but preferably are in the range of about 250 to 2,500.

Instead of using individual polyesters, polyethers or polyetheresters in the reaction with the polyisocyanates to make the prepolymer, mixtures or blends of the polyester, polyether and/or polyetheresters may be employed.

The isocyanates used in making the novel prepolymers of the present invention are aromatic polyisocyanates, preferably diisocyanates. The aromatic di- or polyisocyanates which can be employed in the making of prepolymers for elastic fiber threads can be any of the di- or polyisocyanates well known in the art for reacting with polyesters, polyethers and the like. Examples of useful materials are phenylene diisocyanate, diphenyl- methane p,p'-diisocyanate, naphthylene diisocyanate, tolylene diisocyanate, dicyclohexyl methane diisocyanate, di-p-xylyl methane diisocyanate, diphenylene diisocyanate, cyclohexyl phenyl diisocyanate and the like. Mixtures of these polyisocyanates can be used.

The aromatic isocyanate is used in an amount necessary to react with terminal OH groups of the polyester and the like so that there is obtained an isocyanate terminated polyester. The number of equivalents of isocyanate must be greater than the number of equivalents of terminal hydroxyl groups. For example, where the polyester has 2 OH groups, one at each end of the chain, more than 2 equivalents of a polyisocyanate should be employed.

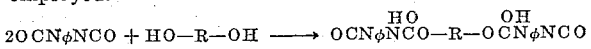

$$2 OCN\phi NCO + HO-R-OH \longrightarrow OCN\phi \overset{HO}{NCO}-R-O\overset{OH}{CN\phi}NCO$$

where $\phi$ is a phenyl radical and R is a polyester nucleus containing a plurality of repeating carbon chains and

$$-O-\overset{O}{\underset{\|}{C}}-$$

groups. Where tri- or polyfunctional polyesters are involved, which would give branched prepolymer systems, more equivalents of the polyisocyanate will be required to insure that all of the terminal hydroxyl groups are converted to terminal isocyanate groups.

Preferably an excess of polyisocyanate of from 30% to 300% on an equivalent weight basis over the amount that would be required to react with all of the terminal hydroxyl groups supplied by the polyester, polyether or polyetherester is employed. The reaction may be effected by mixing polyester and aromatic polyisocyanate under anhydrous conditions generally at 80° to 120° C. to form an uncured, linear prepolymer which is an essentially linear polyurethane having terminal isocyanate groups.

The molecular weights of the polyesters shown above are average molecular weights and, thus, may contain polymers of different chain length. Moreover, depending on the degree of reaction there may be more or less COOH termination. However, as pointed out above, the esterification reaction should be carried out in a manner to insure that the polyester contains a major amount of terminal OH groups or is essentially all OH terminated, it being recognized that it is extremely difficult to obtain a polyester or polyether ester absolutely free of COOH termination.

This invention is based on the discovery that thread or filament of good quality is obtained by forcing a liquified prepolymer which is a reaction product of a polymer having terminal hydroxyl groups with an aromatic polyisocyanate, through a nozzle or spinneret into a solution of a polyamine, said polyamine being a material which has at least three functional groups in its structure and which effects a cure or hardening of the prepolymer filament through its entire volume, not just the skin area alone. No fluid core is left to require further curing with heat, water, or other curing agent or system.

It is essential that the prepolymer first be combined with a polyol compound to extend the polymer chain length and increase its molecular weight before any filaments are formed. This step is necessary to attain a prepolymer which forms a sufficiently strong filament as it passes through the spinneret and into the curing bath to hold its continuity and not break up under the tension applied as the filament is drawn through the bath. We have learned that the preferred equivalent weight range of isocyanate terminated prepolymer to polyol extender is 1.3:1 to 2:1 with 1.5:1 being most preferred as this range results in the best fiber properties. Some terminal isocyanate groups of the prepolymer must be left free for reaction with the polyfunctional curing agent in the curing bath. The available equivalents of hydroxyl in the polyol added must be less in number than the available equivalents of isocyanate on the polyester.

Among the polyol compounds used to modify the prepolymer and increase its molecular weight are materials represented by the formulae: $R(OH)_n$ and $HO(CH_2CH_2O)_nH$ where R is a hydrocarbon residue of a polyhydric alcohol containing 2 to 12 carbon atoms, and $n$ is an integer from 2 to 12. Typical examples of such materials include ethylene glycol, 1,3-butanediol, 1,4-butanediol, pentamethylene glycol, heptamethylene glycol and the like; poly(alkylene oxide) glycols such as diethylene glycol and triethylene glycol. Polyhydroxy materials such as glycerin, trimethylol propane, 1,3,5-hexane triol, sucrose and the like are also useful. Mixtures of glycols may be employed.

The polyamine curing baths into which the polyurethane filaments run after being formed are an essential part of our invention. The amine functional groups provided in the bath react with the terminal isocyanate groups of the polyurethane fiber prepolymer to cure and strengthen the fiber. We have found, surprisingly, that diprimary diamines such as ethylene diamine and hexamethylene diamine do not give full and satisfactory cures of our polyol extended polyurethane prepolymers. They produce a skin effect leaving uncured material in the filament core. We find that we must have at least three functional groups on our curing bath ingredient. Recommended materials have the general formula $H_2N(—CH_2CH_2—NH)_nH$ where $n$ is an integer from 2 to 5 and include diethylene triamine, triethylene tetraamine, tetraethylene pentaamine, pentaethylene, hexaamine, and the like with diethylene triamine being most preferred. Guanidine is also a useful material. If the filaments are left too long in the amine solution, or the solution is too strong, the amine tends to have a degradative effect on the filaments. We have found that an organic solvent such as toluene, ethanol or dioxane is a preferred bath medium in which to dissolve the diethylene triamine. Aqueous solutions give quickly gelled fibers, but they are quite weak. Solutions of diethylene triamine as low as 2% by weight in a hydrocarbon solvent such as toluene will give effective fiber cures. Solution strengths as high as 20% and above by weight can be used, but 3% to 10% solutions are most preferred. With these concentrations a dwell time of filament in the curing bath of 15 seconds to 2 minutes is preferred.

It is desirable to run the filaments through an ethanol wash after they leave the curing bath to remove traces of excess diethylene triamine or other curing agent employed, so as to avoid filament degradation.

Filaments and fibers prepared according to this invention are strong and elastic and perform outstandingly well in the manufacture of such articles as foundation garments, sock tops, golf balls and upholstery.

It has been observed that for some potential uses the percent set of the ultimate fibers obtained is too high. Percent set is determined by stretching a unit length of fiber 300% for one minute, relaxing the fiber for one minute, and measuring the new length. The increase in length over the original length, expressed as percent, is taken as the percent set.

When the polyurethane prepolymer is extended with a polyol material possessing greater than difunctionality, for instance with glycerol, trimethylol propane, hexane triol, sucrose and the like, a desirable low percent set is developed, but tensile strength tends to be low and percent elongation is very low. When the polyurethane prepolymer is extended with a difunctional polyol, tensile strengths and percent elongations are satisfactory, but the percent set is usually in the high range of 15–25%. If the prepolymer is extended with a difunctional polyol and there is also added another polyol material which has a functionality greater than 2, preferably of 3 to 5, percent set is improved to the range of 5 to 12% and tensile strength and percent elongations are maintained at satisfactory levels. The polyol ingredient of functionality greater than 2 probably increases crosslink density by introducing fixed branch points in the modified prepolymer. Typical materials useful in this application are encompassed by the formulae:

$$R(OH)_n \quad N(R'—OH)_3$$

and $$2(HO—R')N—R'—N(R'—OH)_2$$

wherein R is a hydrocarbon residue of a polyhydric alcohol containing from 3 to 5 carbon atoms, R' is an alkylene group containing 2 to 4 carbon atoms and $n$ is an integer from 3 to 5. Glycerol, triethanol amine and tetra kis (2-hydroxypropyl) ethylene diamine may be used. When they are employed in this manner, we have chosen to call these materials setting agents.

An amount of setting agent equal to 1/6 to 3/4 of the excess amount of isocyanate in the prepolymer:polyol mixture on an equivalent weight basis is recommended. For example, if 6 equivalent parts of a difunctional prepolymer are used, 6 terminal isocyanate groups are present. If 2 molar parts of a difunctional polyol containing 2 reactive hydroxyl groups per mol are added, the total of 4 reactive hydroxyl groups will react with 4 of the terminal isocyanate groups leaving 2 free isocyanate groups. For best results 1/3 equivalent to 1.5 equivalents, preferably 2/3 equivalent weight of glycerol or other tri-, tetra- or pentahydroxy polyol should then be employed as a setting agent. This will still leave 1 2/3 equivalents to 0.5 equivalent, preferably 1 1/3 equivalents of available isocyanate for reaction with the amine curing agent. The combined equivalents of polyol extender plus setting agent must be less than the equivalents of isocyanate available.

Also included in the limits of our invention is the procedure of preparing polyurethane materials by the single step or "one-shot" process. By this method polyester, polyether or polyetherester is combined with the polyol extender, the tri-, tetra-, or pentahydroxyl setting agent and sufficient aromatic diisocyanate to insure an excess of isocyanate equivalents over the sum of equivalents of reactive hydroxyl provided by the polyester plus polyol extender plus the setting agent. A single heating and stirring step serves to produce a polyurethane material which can be melt spun into elastic fibers that can be cured by immersion in a curing bath containing a trifunctional amine.

Fibers prepared in the following examples were tested for physical properties on an Instron Testing Machine:

EXAMPLE I

An essentially linear, isocyanate-terminated prepolymer of hydroxyl terminated poly(ethylene adipate) (M.W.=1300) and diphenyl methane p,p'-diisocyanate was prepared by heating 100 grams of the polyester in a stirred one liter flask at 100° C.–110° C. at 5–6 mm. pressure for 20 minutes to remove all gases and moisture. Then 45 grams of the diisocyanate were added and the entire mixture was stirred for one hour and poured into a dry container fitted with a sealed top to protect the prepolymer from moisture contamination. The prepolymer has a molecular weight of 1,400 and an equivalent weight of 700.

EXAMPLE II

Thirty grams of the prepolymer prepared in Example I was mixed with 1,4-butanediol in the ratio of 3:2 on the basis of equivalent weights, until the diol dissolved in the polymer by heating the mixture with gentle stirring to about 100° C. The solution was poured into a Teflon coated aluminum tray and heated at 100° C. for one hour in an air oven, then cooled in a desiccator to room temperature. It is important to protect the prepolymer from moisture contamination.

Solid chips of the modified prepolymer were placed in the chamber of a laboratory micro extruder and heated to 50°–70° C. Under 300 p.s.i. ram pressure filament was extruded through a six mil die, then passed over suitable godet wheels through a curing bath of 5% diethylene triamine in toluene. Next the fiber was washed in ethanol to remove excess traces of the curing bath and dried in an air oven for 5 minutes at 100° C. Test results are reported in Table 1.

Table 1

| Time in curing bath, mins. | Ultimate tensile, p.s.i. | Ultimate Elongation, percent | 300% Modulus, p.s.i. | Set, percent |
|---|---|---|---|---|
| ½ | 9,460 | 440 | 1300 | 17 |
| 1 | 14,450 | 600 | 1100 | 17 |
| 1½ | 14,000 | 590 | 1200 | 20 |
| 2 | 13,000 | 600 | 1000 | 20 |
| 6 | 9,300 | 580 | 750 | 32 |

Curing times of less than one minute or as great as 6 minutes show decreased tensile strength due to incomplete cure in one case and overcure or degradation in the second case.

EXAMPLE III

The prepolymer of the previous example was modified by the inclusion of glycerol in the ratio:

| Material | Eq. Wt. | Equivalents |
|---|---|---|
| Prepolymer | 700 | 9 |
| 1,4-butanediol | 45 | 6 |
| Glycerol | 30⅔ | 1 |

The batch was mixed to the solution stage in a heated, stirred vessel, poured into the Teflon lined mold and held at 100° C. in an oven for one hour. After cooling to room temperature in a desiccator, chips of the modified polymer were placed in the micro extruder barrel and heated 70°–80° C. At 270 pounds ram pressure filament was extruded through a 10 mil die, run through a diethylene triamine curing bath (5% weight solution in toluene), and ethanol washing bath and dried.

Test results are listed in Table 2.

Table 2

| Time in curing bath, mins. | Ultimate Tensile, p.s.i. | Ultimate Elongation, percent | 300% Modulus, p.s.i. | Set, percent |
|---|---|---|---|---|
| ½ | 8,750 | 450 | 840 | 9 |
| 1 | 11,900 | 500 | 930 | 8 |
| 1½ | 12,100 | 560 | 830 | 11 |
| 2 | 10,700 | 570 | 670 | 10 |
| 5 | 7,000 | 550 | 490 | 26 |

A cure time of ½ minute is too short to fully develop the tensile strength of the fiber, and a cure time of 5 minutes results in overcure, lowered tensile strength and high percent set.

Comparison of Table 2 with Table 1 shows that the addition of glycerol lowered the fiber tensile only slightly and greatly improved the percent set. The fibers of Example III are excellent elastic, rubbery threads.

If the fibers are left in the curing bath for too short a time, the cure is incomplete; only the skin is cured, and the still fluid core will have to be cured by a further heat treatment of the fiber. If the fiber is left in the curing bath too long, the amine has a degradative effect and the fiber tensiles are seriously lowered.

When Example III is repeated using 10%, 15% and 20% strength diethylene triamine curing baths, the fiber properties are uniformly lower in tensile, elongation and set.

We claim:

1. A method of making an elastic thread material comprising in combination the steps of providing a low molecular weight polyurethane prepolymer which is a reaction product of a polymer having terminal hydroxyl groups selected from the group consisting of polyesters and polyethers with an excess of an aromatic polyisocyanate, adding to said polyurethane prepolymer a polyol material having terminal hydroxyl groups, said materials being present in proportions such that the number of equivalents of diisocyanate exceeds the number of equivalents of terminal hydroxyl in the polymer plus the polyol, extruding the mixture of prepolymer plus polyol into a curing bath comprising a 2% to 20% by weight solution of a polyfunctional amine compound having at least three functional amine groups for a period of 15 to 120 seconds, washing the extruded thread material with alcohol to remove said polyfunctional amine compound from the surface thereof and drying said thread material.

2. The method of claim 1 wherein the amount of diisocyanate on an equivalent weight basis is equal to 30% to 300% over the amount required to react with all the terminal hydroxy groups supplied by the prepolymer plus the polyol.

3. The method of claim 2 wherein the amount of isocyanate terminated prepolymer to polyol on an equivalent weight basis is in the range 1.3:1 to 2:1.

4. The method of claim 3 wherein the prepolymer is formed from hydroxyl terminated poly(ethylene adipate) and diphenyl methane p,p'-diisocyanate.

5. The method of claim 4 wherein the prepolymer is extended with 1,4-butanediol.

6. A method of making an elastic thread material comprising in combination the steps of providing a low molecular weight polyurethane prepolymer which is a reaction product of a polymer having terminal hydroxyl groups selected from the group consisting of polyesters and polyethers with an excess of an aromatic polyisocyanate, adding to said polyurethane prepolymer a difunctional polyol material having terminal hydroxyl groups and a second polyol material selected from the group consisting of triols, tetra-ols and penta-ols, said materials being present in proportions such that the number of equivalents of isocyanate exceeds the sum of the equivalents of terminal hydroxyl in the prepolymer plus the difunctional polyol plus the second polyol, extruding the mixture of prepolymer plus polyols into a curing bath comprising a 2% to 20% by weight solution of a polyfunctional amine compound having at least three functional amine groups for a period of 15 to 120 seconds, washing the extruded thread material with alcohol to remove said polyfunctional amine compound from the surface thereof and, drying said thread material.

7. The method of claim 6 wherein the amount of diisocyanate on an equivalent weight basis is equal to 30% to 300% over the amount required to react with all the terminal hydroxyl groups supplied by the prepolymer plus the difunctional polyol plus the polyol selected from the group consisting of triols, tetra-ols and penta-ols.

8. The method of claim 7 wherein the amount of isocyanate terminated prepolymer to difunctional polyol on an equivalent weight basis is in the range 1.3:1 to 2:1.

9. The method of claim 8 wherein the prepolymer is formed from hydroxyl terminated poly(ethylene adipate) and diphenyl methane p,p'-diisocyanate.

10. The method of claim 9 wherein the difunctional polyol is 1,4-butanediol.

11. The method of claim 10 wherein the second polyol material is glycerol.

References Cited by the Examiner

UNITED STATES PATENTS

| 2,625,532 | 1/53 | Seeger | 260—77.5 |
| 2,894,919 | 7/59 | Simon | 260—77.5 |
| 3,012,993 | 12/61 | Rogan | 260—77.5 |
| 3,020,249 | 2/62 | Curtis | 260—77.5 |

FOREIGN PATENTS 733,624  7/55  Great Britain.

LEON J. BERCOVITZ, *Primary Examiner.*

H. N. BURSTEIN, *Examiner.*